J. D. HAMMOND.
WAGON ATTACHMENT.
APPLICATION FILED JUNE 13, 1911.
1,059,152.
Patented Apr. 15, 1913.
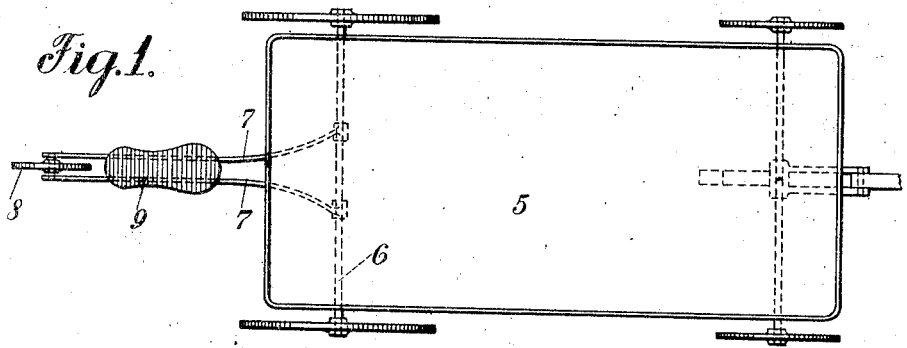
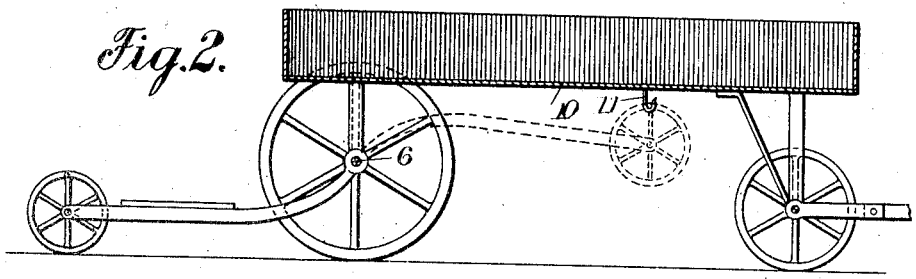
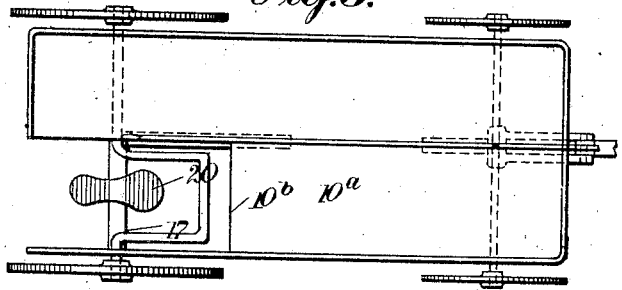
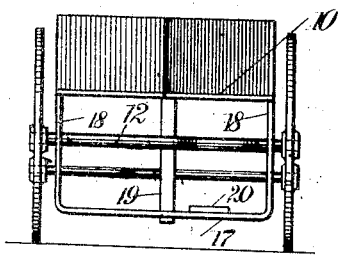
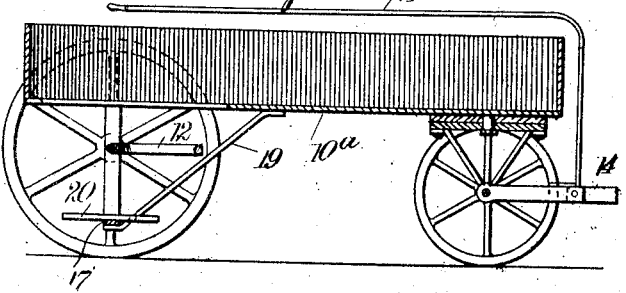
WITNESSES
INVENTOR
Jay D. Hammond
BY
ATTORNEYS

UNITED STATES PATENT OFFICE.

JAY D. HAMMOND, OF GALVESTON, TEXAS.

WAGON ATTACHMENT.

1,059,152.

Specification of Letters Patent.   Patented Apr. 15, 1913.

Application filed June 13, 1911.   Serial No. 632,835.

*To all whom it may concern:*

Be it known that I, JAY D. HAMMOND, a citizen of the United States, and a resident of Galveston, in the county of Galveston and State of Texas, have invented a new and Improved Wagon Attachment, of which the following is a full, clear, and exact description.

My invention relates to wagon attachments, and it has for its object to provide a child's wagon with a device having a foot rest on which one foot of the operator may rest while the operator pushes it with his other foot, the device being so constructed that it may be moved out of the way to permit of the use of the wagon in the customary manner.

Additional objects of the invention will appear in the following complete specification, in which the preferred form of the invention is disclosed.

In the drawings similar characters of reference indicate corresponding parts in all the views, in which—

Figure 1 is a plan view of the invention; Fig. 2 is a side elevation of the invention; Fig. 3 is a plan view of a modified form of the invention; Fig. 4 is a side elevation of Fig. 3; and Fig. 5 is an end view of Fig. 3.

By referring to the drawings it will be seen that the wagon 5 is constructed in the customary manner, and that to the rear axle 6 there are pivoted the arms 7. Journaled in bearings in the free terminals of the said arms 7 there is a wheel 8. A foot rest 9 is secured to and mounted on the arm 7. Under the body 10 of the wagon there is secured a hook 11. It will be seen that when it is not desired to use the foot rest 9, the arms 7 with the foot rest 9 and the wheel 8, may be swung under the body 10 of the wagon, the body of the wagon being raised to permit of this. When the arms 7 are disposed under the wagon the wheel 8 may be supported by the hook 11, so that the arms 7 with the wheel 8 and the foot rest 9, will be held out of the way, to permit of the wagon 5 being used in the usual manner. However, when it is desired to use the foot rest 9, the wheel 8 may be unhooked, so that when the rear of the body 10 is raised, the arms 7 may be disposed rearwardly with the wheel 8, and the foot rest 9, so that the operator may press against the foot rest 9 with one of his feet, while with his other foot he may push against the ground, thereby moving the wagon along the ground.

In the modified view of the invention shown in Figs. 3, 4 and 5 of the drawings, the body 10ª has a cut-out portion 10ᵇ, a U-shaped member 17 being provided, which depends from the body 10ª, the terminals 18 of the U-shaped member being secured to the said body 10ª. A brace 19 is secured near the central portion of the U-shaped member 17, the said brace 19 also being secured to the bottom of the body 10ª. Mounted on the U-shaped member 17, below the cut-away portion 10ᵇ, there is a foot rest 20.

It will be understood that with the modified form of the invention the operator may press against the foot rest 20 in the manner described, so that when his other foot presses rearwardly against the ground the wagon will be driven forwardly in a manner well understood.

The rear axle 12 is V-shaped and bent forward so that it will not interfere with the use of the foot rest 20. A rearwardly extending steering member 13 is secured to the tongue 14 by which the child may steer the wagon while he pushes it forward with his foot pressing against the foot rest 20.

Having thus described my invention I claim as new and desire to secure by Letters Patent:

1. In combination with a wagon a frame pivoted to the wagon, the frame normally extending rearwardly of the wagon, and being adapted to be disposed forwardly and under the wagon, a wheel journaled to the frame, a foot rest mounted on the frame, and a hook secured to the bottom of the wagon for engaging the wheel for supporting the wheel and the frame.

2. In combination with a wagon a frame, pivoted to the wagon on a horizontal transverse axis, the frame normally extending rearwardly of the wagon and being adapted to be rocked forward to a position under the wagon, a wheel journaled in the frame, a foot rest mounted on the frame, and a hook secured to the bottom of the wagon for engaging the wheel and for supporting the wheel and the frame when the wheel is disposed under the wagon.

In testimony whereof I have signed my name to this specification in the presence of two subscribing witnesses.

JAY D. HAMMOND.

Witnesses:
C. A. DREYD,
N. T. SMITH.